United States Patent

Wildhaber

[15] 3,699,822

[45] Oct. 24, 1972

[54] INDEXING DRIVE

[72] Inventor: Ernest Wildhaber, 124 Summit Drive, Brighton, N.Y. 14620

[22] Filed: June 17, 1971

[21] Appl. No.: 154,126

[52] U.S. Cl. .................................... 74/437, 74/820
[51] Int. Cl. ..................... F16h 55/04, B23q 17/02
[58] Field of Search ............... 74/437, 436, 84, 820

[56] References Cited

FOREIGN PATENTS OR APPLICATIONS 790,174   11/1935   France ....................... 74/437

*Primary Examiner*—Leonard H. Gerin

[57] ABSTRACT

A continuously rotating driver and an element to be intermittently indexed are mounted on parallel axes. The driver has an oblong actuating portion that engages generally radial projections of said element. Adjacent projections are separated by spaces whose opposite sides converge towards the axis of said element. The contour of the actuating portion is free of concave curvature while said projections have sides with convex and concave curvature. Preferably the oblong actuating portion is shaped to hold said element in both rotational directions during indexing.

13 Claims, 10 Drawing Figures

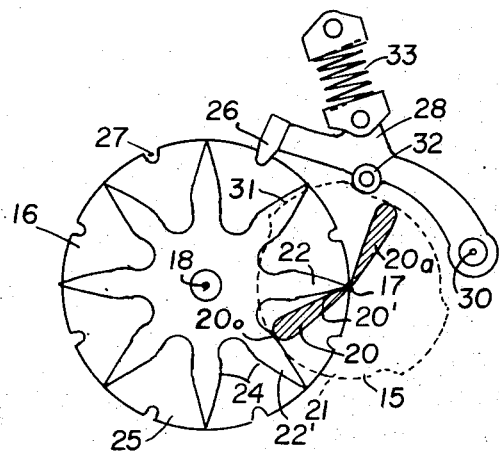
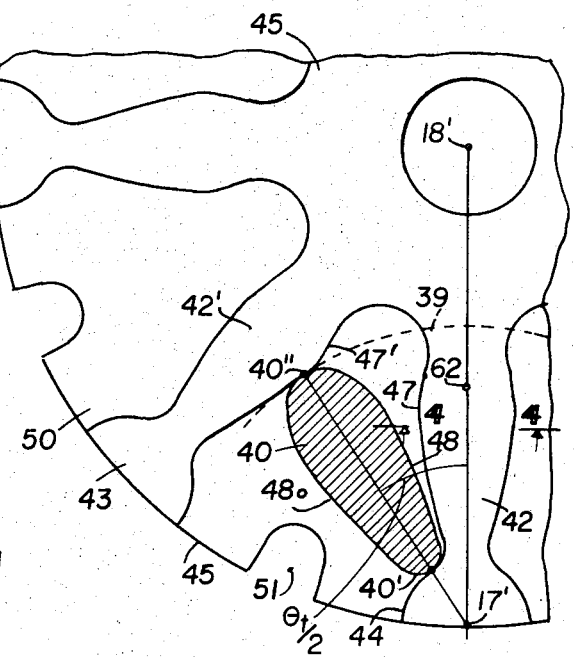
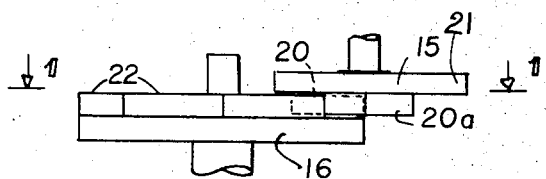
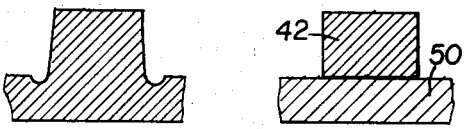
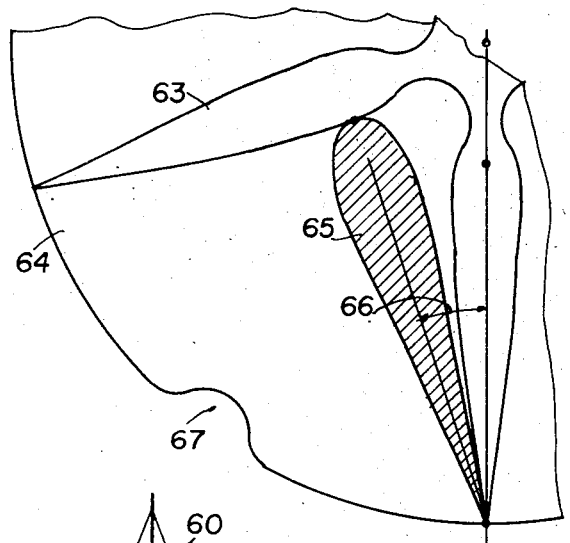
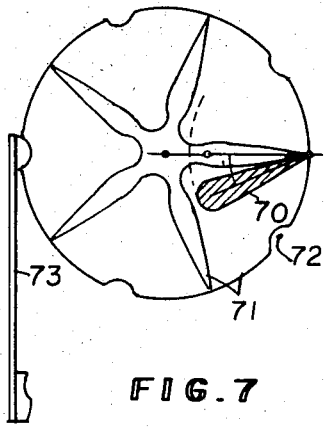
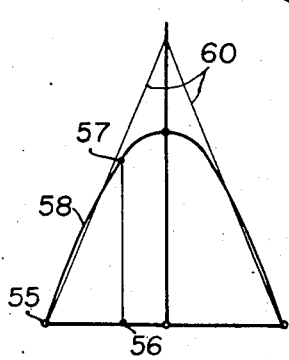

INDEXING DRIVE

The present invention refers to indexing drives where a continuously rotating driver engages an element to be periodically indexed, mounted on an axis parallel to the axis of the driver. One well known indexing drive of this type is the Geneva drive, particularly the one for indexing through quarter turns.

One object of the present invention is to provide an indexing drive with parallel axes having an improved distribution of acceleration and a decreased maximum speed of the driven element. A further aim is to provide an indexing drive that does not require rollers and where only very moderate sliding exists between the intermeshing parts. A further object is to provide an indexing drive where true rolling exists at one portion of the indexing motion. A still other aim is to provide an indexing drive adaptable to indexing through a wide variety of angles, and an indexing drive where the driver turns through a selectable angle during the indexing motion.

Further aims are to provide a practical indexing drive for machine tool turrets and further one for indexing motion-picture film. Other objects will appear in the course of the specification and in the recital of the appended claims.

Embodiments of the invention will be described with reference to the drawings, in which FIGS. 1 and 2 show one embodiment of the invention. FIG. 1 is a section along lines 1—1 of FIG. 2, looking along the arrows. FIG. 2 is a front elevation corresponding to FIG. 1.

FIG. 3 is a fragmentary section similar to FIG. 1, but at a larger scale, showing another embodiment of the invention.

FIG. 4 is a section taken along lines 4—4 of FIG. 3.

FIG. 5 is a similar section of a slightly modified embodiment.

FIG. 6 is a fragmentary section like FIG. 3 showing a further embodiment as applied to an extra-fast five-tooth index.

FIG. 7 is a sectional view similar to FIG. 1 of a five-tooth index suitable for motion-picture film.

FIG. 8 is a velocity diagram showing velocity distribution during indexing.

Figure 9:
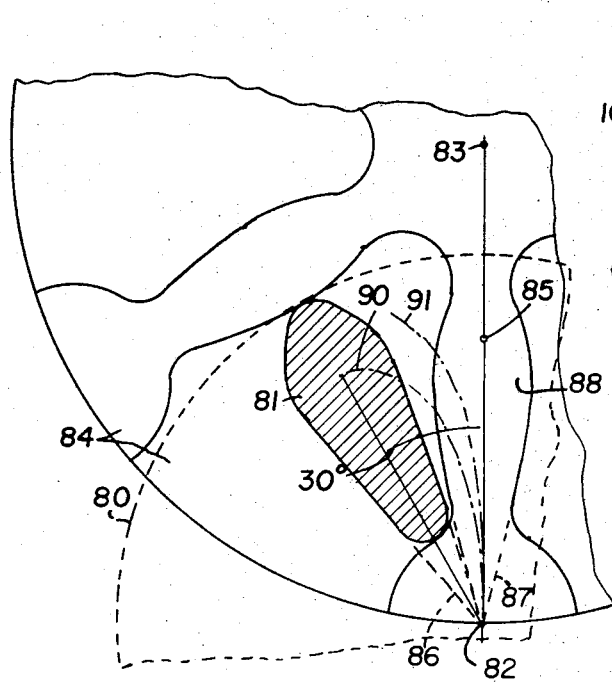
FIG. 9 is a sectional view similar to FIG. 3 but applied to a six-tooth or six-station index.

In FIGS. 1 and 2 the driver 15 and the rotatable element 16 to be intermittently indexed are mounted on parallel axes 17 and 18. Driver 15 may have one oblong actuating portion 20 or a plurality of portions 20, 20a as shown. The indexing motion itself is identical for each portion.

The drive will first be described with a single actuating portion 20. It is rigid with a disk or plate 21. Portion 20 is oblong and wedge-shaped and reaches to the axis 17 of the driver. Its contour is free of concave curvature. It may be convex throughout, or have convex and straight portions. It engages generally radial projections 22 of element 16. These contain convex portions on their working sides 24 and concave portions adjacent their root. The sides 24 of adjacent projections, such as 22, 22' converge towards the axis 18 of element 16.

It should be noted that the outside end $20_0$ of actuating portion 20 is in contact or near-contact with side 24 of projection 22' while the side 20' starts working contact at 17 with a side 24 of adjacent projection 22. The shown position is the start of the indexing motion on clockwise rotation of the driver 15. In this position element 16 is held against rotation in both directions by the driver 15. The outer end profile of the actuating portion is so related to the profile 24 adjacent the tooth bottom that contact is maintained all during the indexing motion. This will be further described hereafter.

Means are provided to maintain element 16 stationary in the intervals between indexing, that is during the dwell. This means may be an index plate 25 that is part of element 16, and a pawl 26 or equivalent adapted to engage the notches 27. The pawl 26 is fixed to a lever 28 pivoted on stationary axis 30. Disengagement of pawl 26 from notch 27 is by means of a camtrack 31 that operates the outward motion of lever 28 and is part of plate 21. It acts on a roller 32 of lever 28. The inward motion is effected by a spring 33. It keeps roller 32 pressed against the cam track during indexing; and it keeps the pawl pressed into a notch 27 during dwell time. If desired, the inward motion may also be constrained positively.

A single actuating portion 20 may be formed integral with plate 21. When more than one operating portions 20, 20a are used, they are preferably secured to plate 21, unless they are of the type shown in FIG. 3, to be described.

A plurality of actuating portions may be spaced equally about the axis 17 of the driver, or unequally, as shown. Unequal spacing of two actuating portions provides pairs of unequal dwell times. This is useful when on a machine tool two successive operations require different times. With as many as eight stations more than two actuating portions may be used when desired.

FIG. 3 illustrates a modified eight-station index drive in which the wedge shape of the actuating portion is avoided. The actuating portion 40 is also of oblong shape, but without the wedge reaching to axis 17'. Its outline or contour has an inner rounded end 40' short of axis 17' of the driver 39. The width of the generally radial projections 42 of element 45 is correspondingly enlarged adjacent their outer ends 43. They contain circular arcuate profile portions 44 adjacent the outside periphery of element 45. Arc-portions 44 are centered at 17', and broadly at the same distance from axis 18' as axis 17'.

The outer end of the actuating portion 40 is in contact or near contact at 40" with the side 47' of projection 42'. Projection 42' is directly adjacent projection 42 with which the actuating portion is in driving engagement, as the driver rotates clockwise. During the indexing acceleration its portion to the left of point 40" stays in contact with side 47'. The acceleration load is on side 48 of the actuating portion and on the mating side 47 of projection 42. After top speed is attained in the central position of the actuating portion, the deceleration load is taken by the opposite side $48_0$ and side 47' of projection 42'. The outer end profile of the actuating portion contacts side 47 adjacent its root.

The actuating portion 40 may be formed integral with the plate from which it projects. A plurality of actuating portions may be spaced about axis 17' of the driver, if desired.

The projections 42 of element 45 are all in one piece. It has the shape of a wheel hub with spokes. This piece may be bonded by non-metallic or metallic bond to the base plate 50, as shown in section in FIG. 4. Such a design facilitates production. FIG. 5 shows an integral construction instead.

Base plate 50 contains notches 51 for holding the element 45 stationary during the dwell portions of the cycle. Except for the described modifications adjacent axis 17' the profiles of the cooperating parts are the same as for embodiments with projections that have wedge-shaped outer ends.

In establishing cooperating profiles the desired velocity distribution may first be assumed. One such distribution is plotted in FIG. 8. The horizontal abscissa, for instance distance 55–56, represents the turning angle $\theta$ of the driver, while the corresponding ordinate 56-57 is proportional to the angular velocity of the indexed element. It represents $d\theta'/d\theta$, $\theta'$ being the turning angle of the indexed element. Curve 58 is a parabola. It places the largest acceleration at the start of the indexing motion, where the driver acts on the outer portions of the indexed element.

A parabolic distribution of $d\theta'/d\theta$ keeps the maximum value of $d\theta'/d\theta$ and the maximum angular speed of the indexed element to a minimum.

If $\theta_t$ denotes the total turning angle of the driver during the indexing motion, and $\theta'_t$ the angle through which the element is indexed, for instance 90° for a four-tooth or four-station index, 45° for an eight-station index, then the maximum $d\theta'/d\theta$ can be shown to amount to 1½ $\theta'_t/\theta_t$ with said parabolic distribution. In FIG. 3 $d\theta'/d\theta$ has a maximum value of unity (1), $\theta_t$ being 1½ $\theta'_t = 67½$ degrees.

The drawings are based on such a distribution. However other distributions may also be used. Lines 60, FIG. 8, describe constant acceleration and deceleration.

After assuming the velocity distribution the maximum velocity ratio $d\theta'/d\theta$ can be readily computed, and with it the location of the pitch point 62 at the central position of the actuating portion, and the position of the actuating portion at the start and end of the indexing motion.

Then the profile of the actuating portion may be assumed as far as needed for acceleration and deceleration of the element. The mating profile of the projections (42) of the element can now be determined as the envelope of the known relative positions of the actuating portion during the assumed motion. The portions adjacent the root of the enveloped profile may be assumed. Then the outer end of the actuating portion may be determined as the envelope of the profile of the element.

It is advisable to approximately determine the best proportion of $\theta'_t/\theta_t$ on the drawing board to achieve dual contact.

At point 40'' (FIG. 3) the profile 47' has a direction peripheral to axis 17'. And the mean thickness of the actuating portion should be about equal to the mean thickness of projection 42. Such preliminary determination will save many trials.

FIG. 6 shows a very fast index drive for five teeth 63 on element 64. It has a slender actuating portion 65. Indexing starts at an angle 66 = ½$\theta_t$ of the driver. $\theta_t$ is here only a tenth of a turn. Element 64 contains notches 67 to maintain it stationary during the dwell time.

FIG. 7 shows an index drive that may be used for indexing motion-picture film in place of the Geneva drive. The angular top speed of element 71 has the same proportion to the angular speed of the driver as in the Geneva drive for indexing through a right angle, and the maximum accelerations are closely equal. As the projection light has to be locked off during only half the period required in the Geneva drive, a brighter projected picture results. This is due to the decreased angle $\theta_t$ through which the actuating portion 70 turns during indexing. $\theta_t$ is 45 degrees instead of 90° in the Geneva drive.

Element 71 has notches 72 engageable by a resilient retainer 73, to maintain it stationary during the dwell period. Such indexing drives are lightly loaded and can be kept small.

FIG. 9 is generally similar to FIG. 3 but refers to a six-tooth or six-station index. $\theta_t$ is shown as 60 degrees, equal to $\theta'_t$. The driver 80 with actuating portion 81 is mounted on an axis 82 parallel to the axis 83 of element 84 to be indexed. 85 denotes the instant axis at the central position of the actuating portion 81. With the described parabolic velocity distribution of element 84, the latter has a maximum rotational speed 1½ times that of the driver 80. Dotted lines 86 indicate a wedge-shaped actuating portion for comparison. Dotted lines 87 show the corresponding ends of the projections 88.

Dash-and-dot lines 90, 91 are what might be called pitch lines. Like pitch circles on gear pairs, they are curves rigid with the driver and element 84 respectively, rolling on each other without sliding. It is seen that the working profiles are close to the pitch lines and they intersect the pitch lines. Because of their small distance therefrom there is little sliding on the load side. Sliding compares with the amount of sliding on spur-gear teeth. At the point of intersection of the pitch line with the tooth profile there is pure rolling contact.

Figure 10:
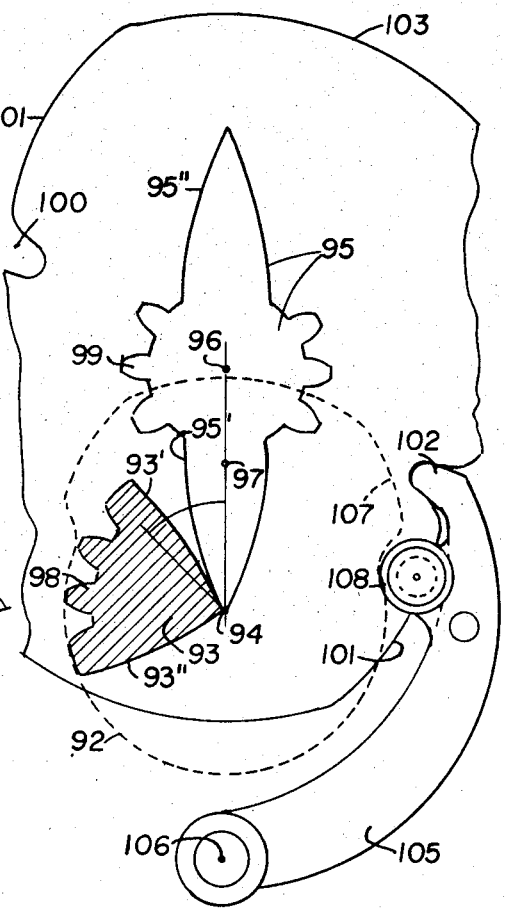
FIG. 10 is a fragmentary view similar to FIG. 9, showing the invention as applied to a two-station index.

FIG. 10 shows a two-station index. The driver 92 with actuating portion 93 rotates uniformly on axis 94, while the driven element 95 turns on an axis 96 parallel to axis 94. On clockwise rotation on axis 94 profile 93' of the driver engages profile 95' of element 95. It accelerates the element to top speed corresponding to an instant axis 97. Both, driver 92 and element 95, have then turned through 45°. Element 95 then rotates 1½ times as fast as driver 92. Now the gear teeth 98 take over. They mesh with teeth 99 of element 95 to turn element 95 through a right angle while the driver turns through 60°. Profile 93'' then decelerates element 95 by engagement with profile 95''. Deceleration takes again 45° on both the driver and on element 95. Said element has then completed a half turn, while the driver has turned through 150°. The dwell lasts through 210° of the driver. Thereafter element 95 is indexed through another half-turn.

An index plate with two notches 100 is rigid with element 95.

During acceleration and deceleration the working profiles 93', 93'' and their mates do not hold element 95 positively in both directions. While there is little likelihood of their drifting apart, it is nevertheless advisable to hold element 95 in both directions also during acceleration and deceleration. To hold it in a direction opposite to the inertia loads is merely a positioning process requiring little load.

According to the invention the index plate contains not only the notches 100, but also in continuation thereof a cam profile 101 for the pawl 102 to follow during acceleration and deceleration. During the mesh of the gear teeth 98, 99 element 95 is held in both directions, so that the cam outline of the index plate may have circular portions 103 centered at 96. During the dwell the element 95 is held by the engagement of the pawl 102 with a notch 100.

Pawl 102 is rigid with a lever 105 that has a stationary pivot centered at 106. Its motion is controlled with a cam 107 of the driver. The cam acts on a roller 108 rotatably secured to lever 105. If enforces the outward motion of the lever that withdraws the pawl from the notch engaged therewith. Inward motion may be effected by a spring (not shown) or other known suitable means.

While the invention has been described with several embodiments thereof, it is capable of further modifications, by applying common knowledge and current practice in the art to which the invention pertains, and without departing from its spirit. For definition of its scope it is relied on the appended claims.

What I claim is:

1. An indexing drive comprising
   a rotary driver and an element to be intermittently indexed about an axis parallel to the axis of said driver,
   said element having a plurality of generally radial projections spaced about its axis and separated by spaces whose opposite sides converge towards said axis,
   said driver having an actuating portion of oblong shape longer in radial direction than transversely thereto and being adapted to contact the sides of said projections,
   the contour of said actuating portion being free of concave curvature,
   the contour of said projections containing convex and concave portions,
   and means for maintaining said element stationary between indexing motions.

2. An indexing drive according to claim 1, wherein the means for maintaining said element stationary comprises a notched index plate having spaced recesses and a part movable into said recesses.

3. An indexing drive according to claim 2, wherein said part is spring-pressed into said recesses.

4. An indexing drive according to claim 2, wherein said index plate is cam-shaped between its notches.

5. An indexing drive comprising
   a rotary driver and an element to be intermittently indexed about an axis parallel to the axis of the driver,
   said element having a plurality of generally radial projections spaced about its axis and separated by spaces whose opposite sides converge towards said axis,
   said driver having an actuating portion of oblong shape longer in radial direction than transversely thereto and being adapted to contact the sides of said projections,
   the contour of said actuating portion being free of concave curvature,
   said actuating portion and projections being shaped to have double contact, contacting opposite sides of adjacent projections of said element all during the indexing motion with a backlash less than one fiftieth of the outside diameter of said element, to hold said element in both directions during indexing,
   one of said contacts being at the radially outermost end of said actuating portion at the start and end of the indexing motion,
   and means for maintaining said element stationary between indexing motions.

6. An indexing drive according to claim 1 for film projection apparatus, wherein the element is a drum having five generally radial projections, said projections and the actuating portion being proportioned so that the driver turns through less than sixty degrees to complete the indexing motion of said drum.

7. An indexing drive according to claim 6 for film projection, wherein the proportions are such that the driver turns through forty five degrees to complete the indexing motion of said drum.

8. An indexing drive according to claim 1, wherein the driver contains a plurality of identical actuating portions spaced about its axis.

9. An indexing drive according to claim 8, wherein said plurality of actuating portions are unequally spaced about the axis of the drive, to achieve different durations of dwell.

10. An indexing drive according to claim 1, wherein the actuating portion of the driver reaches to the axis of the driver.

11. An indexing drive according to claim 1, wherein the actuating portion of the driver is offset from the axis of the driver, the generally radial projections of the intermittently indexed element increase in width adjacent its outside diameter.

12. An indexing drive according to claim 11, wherein said radial projections contain a convex circular profile portion immediately adjacent the outside periphery of the intermittently indexed element, said profile portion being centered at the same distance from the axis of said element as the axis of the driver.

13. An indexing drive according to claim 11, wherein the radial projections of the intermittently indexed element cohere at the center of the element and are bonded to a holding plate.

* * * * *